June 27, 1967 AKIO HAYAMA 3,327,979
ROLLABLE TRIPOD
Filed Aug. 15, 1966
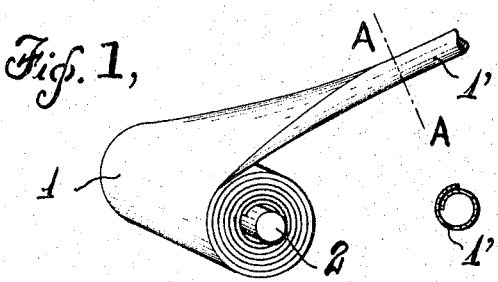
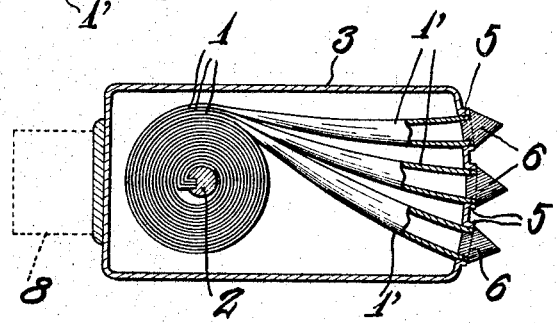
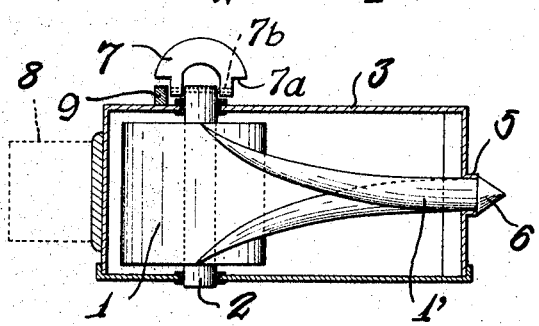
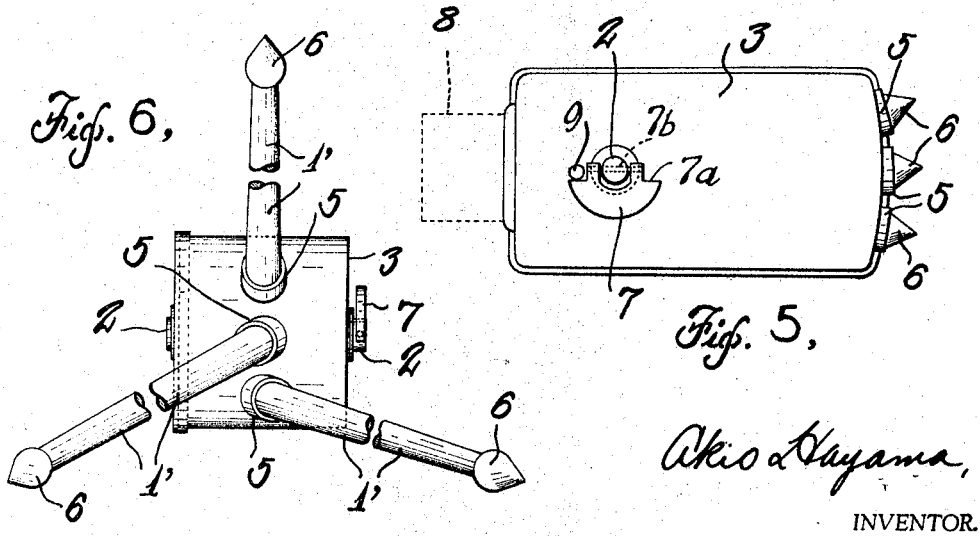
Akio Hayama,
INVENTOR.

United States Patent Office 3,327,979
Patented June 27, 1967

1

3,327,979
ROLLABLE TRIPOD
Akio Hayama, 8 Miyakojima-Hondori-8-chome,
Miyakojima-ku, Osaka, Japan
Filed Aug. 15, 1966, Ser. No. 572,352
Claims priority, application Japan, Aug. 25, 1965,
40/51,465
2 Claims. (Cl. 248—166)

The present invention pertains to a tripod for a camera and is characterized by having a plurality of belt-like members each of which forms a tube when it is unrolled from a winding shaft through a forming tube and which is rolled up on its spring loaded shaft when the tripod is not in use.

Generally, portable tripods for a camera consist of a number of extensible pipes having joints therein, but those tripods are difficult to make light and compact due to their form. The purpose of the present invention is to provide a compact tripod of simple construction which is easy to operate and which can always be mounted on any portable camera.

The invention will now be described in connection with the accompanying drawings in which:

FIG. 1 is an oblique view to show how a belt-like member changes its form to a tube when it is unreeled;

FIG. 2 is a sectional view taken on line A—A of FIG. 1 of the tube thus formed;

FIG. 3 is a vertical sectional view of a tripod in accordance with the present invention;

FIG. 4 is a horizontal view partly in section of the tripod of FIG. 3;

FIG. 5 is a front view of the tripod; and

FIG. 6 is a bottom view of the tripod showing how its legs stretch out in each direction.

Each tube 1' which forms a leg of the tripod, as shown in FIG. 1, is formed by a belt-like strip 1 of heat-treated phosphor bronze or other flexible resilient metal which is 0.2–0.3 mm. thick. When the rolled up belt-like member is unrolled off and is shaped so as to form a tube by causing both edges to overlap each other, the tube thus formed has almost the same strength with respect to a bending force as ordinary seamless pipe of the same thickness and diameter, and it can support a load of 1,000–2,000 g. At the time when the belt-like member is rolled around a shaft 2 having an appropriate diameter, the belt-like member 1 becomes flat and can be rolled up by spring loading the shaft.

As shown in FIGS. 3, and 4, three forming rings 5 are mounted on one side of a case 3 and have their respective axes directed in different directions so as to form a tripod. The belt-like strips 1 extend through the forming rings 5 in which they are rolled up into the tube. Each tube has a non-skid shoe 6 on the free end thereof. The other end of each belt-like strip 1 is fixed to the shaft 2, and the three belt-like strips can be rolled up on the shaft 2 in overlapping relationship.

The shaft 2 is mounted on the wall of case 3, and on one end has a handle 7 mounted on a pin 7b extending transversely of the shaft 2 so that it can be pivoted on the pin to rotate shaft 2 to roll up the belt-like strips 1. A stand 8 to support a camera is provided on the top of the case 3 and enables the camera to be turned in any desired direction when the belt-like strips 1 are extended as legs of a tripod.

When the belt-like strips 1 are extended and straightened, they spread out at even intervals in the directions in which the axes of rings 5 are directed as shown in FIG. 2 to form a tripod.

The handle 7 has notches 7a in the edge thereof opposite the ends of pin 7b which engage with a stop 9 on the casing 3 adjacent the handle 7 to block rotation of handle 7 and thus fix the belt-like strips 1 in their extended positions.

Thus, it is possible to manufacture a compact and inexpensive tripod which can be mounted on any portable camera. It is, of course, possible to make changes in the design of the tripod in so far as such changes do not deviate from the principle of the present invention.

What I claim as my invention is:

1. A camera tripod, comprising a casing, a rotatable shaft in said casing, a plurality of at least three forming rings in the wall of said casing having the axes thereof extending in different directions, and a plurality of flat belt-like strips of flexible resilient material corresponding in number to the number of forming rings and having their one ends attached to said rotatable shaft and having the other ends extending through the respective forming rings and being rolled from their flat shape into tubular legs in said forming rings, feet on the tubular free ends of said strips outside said casing, and means on said casing for attaching a camera thereto.

2. A camera tripod as claimed in claim 1 in which said shaft has a handle pivoted thereon on the outside of said casing and an axis transverse to the axis of said shaft, and a stop on said casing adjacent said handle and with which said handle cooperates when it is pivoted so as to lie against the casing to block rotation of said shaft.

References Cited

UNITED STATES PATENTS 3,188,675   6/1965   Beck _____ 248—188.5

CHANCELLOR E. HARRIS, *Primary Examiner.*

CLAUDE A. LEROY, *Examiner.*